United States Patent

[11] 3,589,221

[72] Inventor James J. Deegan
 Clarendon Hills, Ill.
[21] Appl. No. 759,886
[22] Filed Sept. 16, 1968
[45] Patented June 29, 1971
[73] Assignee Inland Steel Company
 Chicago, Ill.

[54] METHOD FOR CUTTING SCRAP METAL HAVING STAGGERED ROWS OF SUBSTANTIALLY CIRCULAR OPENINGS
 9 Claims, 6 Drawing Figs.
[52] U.S. Cl.................................................. 83/41,
 83/42, 83/620, 83/923
[51] Int. Cl....................................................... B26d 3/24
[50] Field of Search........................................ 83/40, 41,
 42, 255, 405, 560, 620, 923, 559

[56] References Cited
UNITED STATES PATENTS
| 1,656,794 | 1/1928 | Messenger | 83/40 |
| 2,268,052 | 12/1941 | Miller | 83/923 X |
| 2,537,540 | 1/1951 | Messenger | 83/923 X |
| 3,157,082 | 11/1964 | Thompson | 83/923 X |
| 3,252,363 | 5/1966 | Hardy | 83/923 X |
| 1,816,806 | 7/1931 | Gangloff et al. | 83/237 X |
| 2,733,766 | 2/1956 | Wikle | 83/559 X |
| 3,455,197 | 7/1969 | Richardson | 83/559 X |
| 3,503,291 | 3/1970 | Pouilloux | 83/42 |

FOREIGN PATENTS
| 19,449 | 4/1930 | Australia | 83/41 |

Primary Examiner—Andrew R. Juhasz
Assistant Examiner—Leon Gilden
Attorney—Wolfe, Hubbard, Leydig, Voit and Osann ABSTRACT: Method for cutting strips or sheets of scrap metal or the like from which substantially circular sections have been removed in a pattern of staggered longitudinal rows to form corresponding rows of openings. The strip or sheet is cut transversely along successive parallel lines with alternate lines passing through the centers of adjacent openings in at least two adjacent rows, and the intervening lines intersecting the longitudinal center lines of the rows of openings in the areas between adjacent openings in each row, so that symmetrical areas of the intersected openings lie on opposite sides of each line in each row. This cutting pattern has the advantage of providing cut scrap which is of relatively uniform size and shaped to provide a high density when the scrap is packed in containers, and a relatively small amount of metal is sheared in each cut.

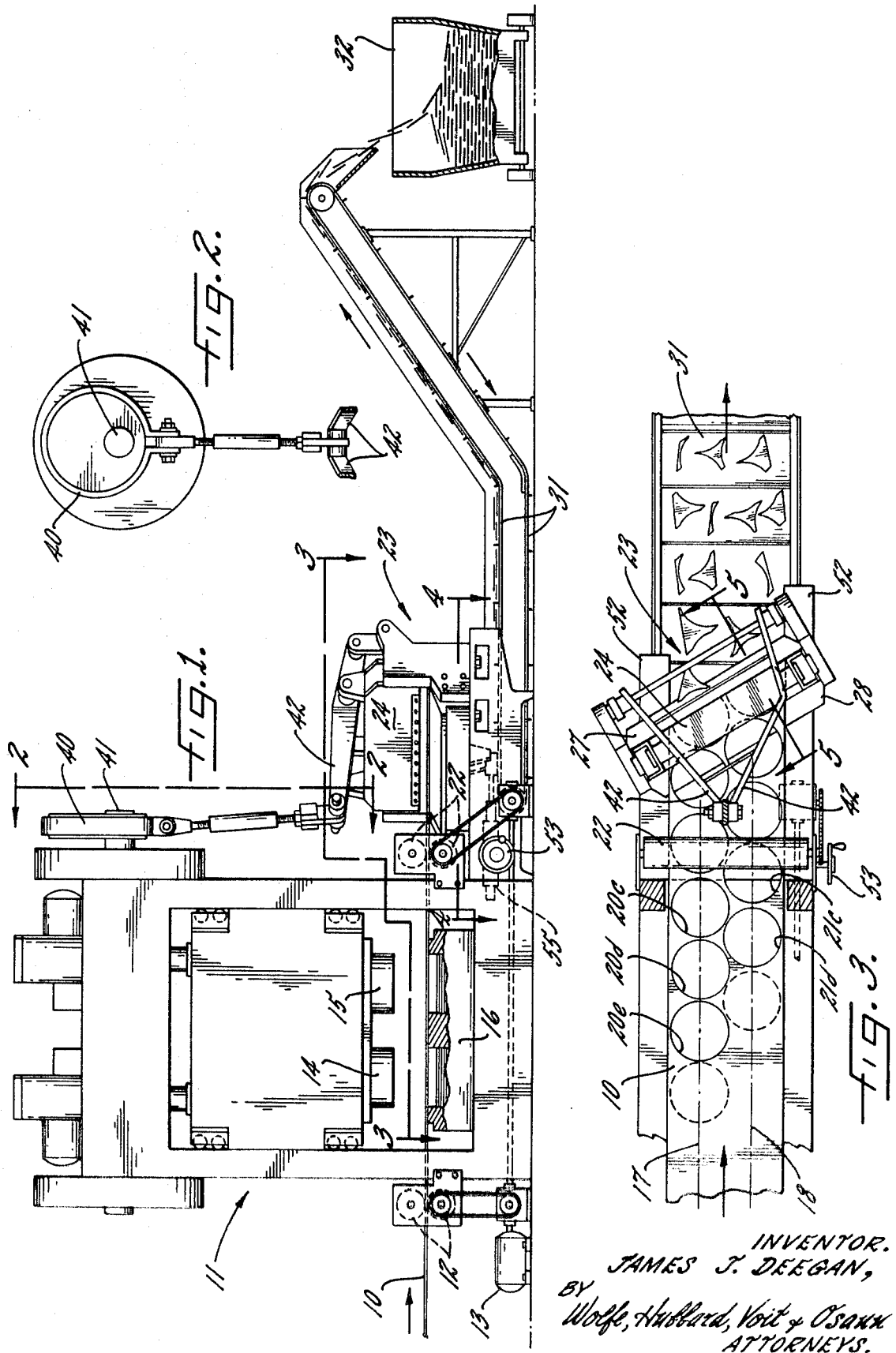

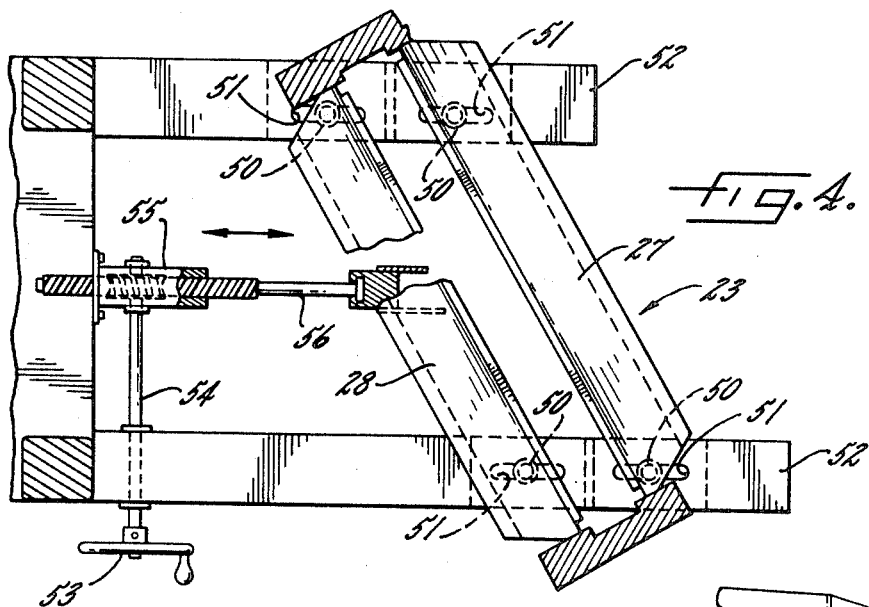
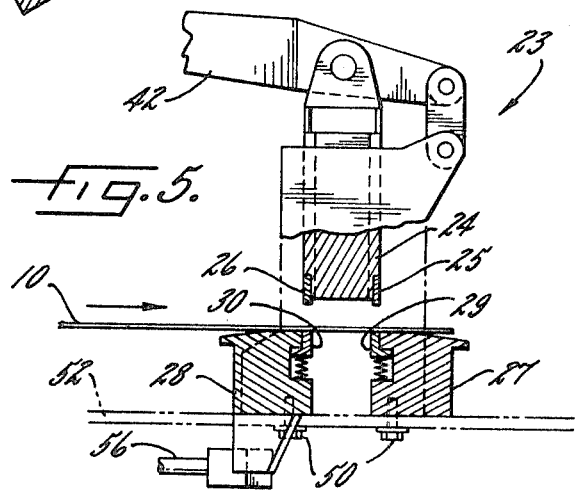
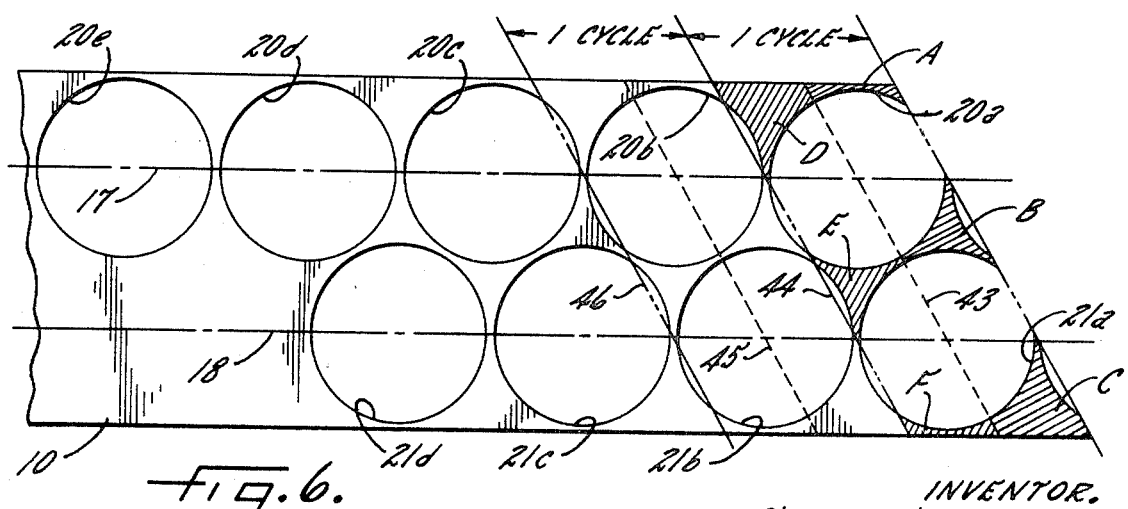
INVENTOR.
JAMES J. DEEGAN,
BY
Wolfe, Hubbard, Voit & Osann
ATTORNEYS.

3,589,221

METHOD FOR CUTTING SCRAP METAL HAVING STAGGERED ROWS OF SUBSTANTIALLY CIRCULAR OPENINGS

The present invention relates generally to the cutting of scrap metal and the like and, more particularly, to an improved method and apparatus for cutting elongated strips or sheets of scrap metal from which substantially circular sections have been removed in a pattern of staggered longitudinal rows.

In certain punch press operations, such as those involving the continuous coil feeding of strip steel, the scrap skeleton produced by the press is cut into pieces of manageable size by one or more press-driven cutting blades mounted perpendicular to the longitudinal axis of the strip skeleton. This conventional scrap cutting operation is satisfactory when only a single longitudinal row of circular discs or other articles is removed from the strip, but it has a number of shortcomings in cases where the strip yields more than one blank across its width, particularly where the adjacent rows of blanks are staggered relative to one another. Thus, in the blanking of circular discs in a pattern of staggered longitudinal rows, for example, the conventional cutting equipment is not capable of cutting the skeleton at the points of minimum thickness and, consequently, the resulting cut scrap pieces are relatively long with a number of weak points which cause the pieces to bend when they are packed in containers. This bending is undesirable because it reduces the density of the scrap in the packed containers, thereby increasing the cost of packing, storing, and transporting the scrap. Accordingly, the conventional scrap cutting arrangement has not been satisfactory for this type of blanking operation.

It is a primary object of the present invention to provide an improved method and apparatus for cutting scrap material from which substantially circular sections have been removed in a pattern of staggered longitudinal rows, which method and apparatus produces cut scrap of relatively small and uniform size and relatively high strength to minimize bending during packing thereof. In this connection, it is a related object of the invention to provide such an improved method and apparatus which produce cut scrap that can be packed with a relatively high density because of the reduced number of weak points in the cut scrap pieces, which in turn reduces the tendency of the cut scrap pieces to bend.

Another object of the present invention is to provide an improved scrap cutting method and apparatus of the foregoing type which can be used to cut scrap skeletons in which the dimensions of the openings change periodically due to changes in the dimensions of the blanks formed therefrom.

A further object of the invention is to provide such an improved scrap cutting method and apparatus which permits the scrap material to be cut in a two-blade system which can by synchronized exactly with the movement of a blanking press or the like. A related object of the invention is to provide such an improved scrap cutting method and apparatus which are readily adaptable to conventional press-mounted scrap cutters, so that the method can be practiced by simply making certain modifications to existing equipment.

It is still another object of the present invention to provide an improved scrap cutting method and apparatus of the type described above which requires only a relatively small amount of metal to be sheared along each cutting line, thereby facilitating the cutting operation and reducing the wear on the scrap cutting equipment.

Other objects and advantages of the invention will become apparent from the following detailed description and the accompanying drawings, in which:

FIG. 1 is a simplified elevation of a scrap cutting system embodying the present invention;

FIG. 2 is a view taken along line 2-2 in FIG. 1 showing the eccentric drive arrangement for the cutting head;

FIG. 3 is a section taken along line 3-3 in FIG. 1;

FIG. 4 is an enlarged section taken along line 4-4 in FIG. 1;

FIG. 5 is an enlarged section taken along line 5-5 in FIG. 3; and

FIG. 6 is an enlarged plan view of a section of the scrap metal skeleton entering the cutting equipment in the system of FIG. 1.

While the present invention is susceptible of various modifications and alternative forms, one specific embodiment thereof has been shown by way of example in the drawings which will be described in detail herein. It should be understood, however, that it is not intended to limit the invention to the particular forms disclosed, but, on the contrary, the intention is to cover all modifications, equivalents, and alternatives falling within the spirit and scope of the invention as expressed in the appended claims.

Turning now to the drawings, and referring first to FIG. 1, a continuous coil of strip steel 10 is fed into a conventional punch press 11 by means of a pair of feed rollers 12 driven by a motor 13. The metal strip 10 is advanced longitudinally through the press 11 which blanks successive pairs of circular discs from the strip 10 by means of a pair of punches 14 and 15 cooperating with a complementally shaped die 16. The circular discs are blanked from the strip 10 along two longitudinal center lines designated 17 and 18 in FIG. 6, which shows a plan view of a section of the scrap skeleton emerging from the punch press 11. As can be seen in both FIG. 3 and FIG. 6, the blanking of successive pairs of discs along the length of the strip 10 forms two corresponding rows of circular openings 20$a$, 20$b$, 20$c$ etc. and 21$a$, 21$b$, 21$c$ etc., respectively. The centers of the openings in the two rows are staggered or offset from one another, so that the centers of the openings 20 in one row are longitudinally positioned midway between the centers of the openings 21 in the adjacent row. Also, as can be seen in FIGS. 3 and 6, each opening is spaced slightly away from each adjacent opening so that a thin web of metal is formed in the resulting scrap skeleton between each pair of adjacent circular openings. It can be seen that if the scrap skeleton is cut transversely along lines which are perpendicular to the longitudinal axis of the strip skeleton, it is not possible to cut the skeleton at each and every point where the skeleton has a minimum thickness, i.e., at each point where a line intersecting the centers of a pair of adjacent openings intersects the edges of such openings.

As the scrap skeleton emerges from the punch press 11, it passes between a second pair of feed rollers 22 which advance the skeleton into a scrap cutting unit indicated generally at 23. As shown most clearly in FIG. 5, the cutting unit 23 includes a shear head 24 carrying a pair of shear blades 25 and 26 on opposite transverse edges thereof. Each time the shear head 24 is driven downwardly, the two blades 25 and 26 cooperate with a corresponding pair of shear members 27 and 28, respectively, to cut the scrap skeleton into a number of smaller pieces of scrap metal. As the blades 25 and 26 shear the scrap skeleton, they depress a corresponding pair of springZloaded stripper bars 29 and 30, respectively, which are automatically returned to their normal elevated positions shown in FIG. 5 by the spring loading when the shear head 24 is returned to its elevated position. The cut pieces of scrap are sheared in two transverse sections, with the scrap pieces in the forward section, i.e., on the forward side of the blade 25, sliding down the inclined top surface of the member 27 onto a driven conveyor 3z (FIG. 1). The scrap pieces in the second section, i.e., the scrap pieces lying between the two blades 25 and 26, drop down through the cavity formed between the two shear members 27 and 28 onto the conveyor 3z. The conveyor 3z then transports the scrap pieces to a suitable hopper or transport container 32. spring-loaded stripper bars 29 and 30, respectively, which are automatically returned to their normal elevated positions shown in FIG. 5 by the spring loading when the shear head 24 is returned to its elevated position. The cut pieces of scrap are sheared in two transverse sections, with the scrap pieces in the forward section, i.e., on the forward side of the blade 25, sliding down the inclined top surface of the member 27 onto a driven conveyor 31 (FIG. 1). The scrap pieces in the second section, i.e., the scrap pieces lying between the two blades 25 and 26, drop down through the cavity formed between the two shear members 27 and 28 onto the conveyor 31. The conveyor 31 then transports the scrap pieces to a suitable hopper or transport container 32.

For the purpose of synchronizing the successive downward strokes of the shear head 24 with the blanking operation effected by the punch press 11, the drive for the shear head is derived from the punch press drive in a conventional manner. More particularly, as can be seen in FIGS. 1 and 2, an eccentric cam 40 is mounted on the end of the press drive shaft 41, and is coupled to a shear arm 42 to periodically lower and raise the shear head 24 in synchronism with the downward strokes of the press punches 14 and 15. Consequently, the two pairs of feed rollers 12 and 22 may be driven at the same rate so as to intermittently advance the metal strip and the scrap skeleton in steps corresponding to the distance between the center points of successive blanks in each of the two longitudinal rows.

In accordance with the present invention, the scrap skeleton is cut transversely along successive longitudinally spaced lines which are substantially parallel to a line passing through the centers of two adjacent openings in two adjacent rows of such openings. Thus, in the particular embodiment illustrated in the drawings, the scrap skeleton is cut along successive pairs of lines 43, 44 and 45, 46 which correspond to the cutting lines of the shear blades 25 and 26 (FIG. 5). Due to the synchronization of the repetitive downward strokes of the cutting head with the advancing longitudinal movement of the scrap skeleton, and with the pattern of the two staggered rows of openings 20 and 21, one of the cutting lines in each pair, e.g., lines 43 and 45 followed by the blade 25, pass through the centers of two adjacent openings in the two adjacent rows. More particularly, cutting line 43 passes through the centers of adjacent openings 20a and 21a (FIG. 6), and cutting line 45 passes through the centers of adjacent openings 20b and 21b. The other cutting line in each pair, e.g., lines 44 and 46 followed by blade 26, intersects the longitudinal center lines 17 and 18 of the two rows of openings in the areas between the adjacent openings in each row. For example, cutting line 44 intersects the center line 17 of the openings 20 in the area of minimum thickness between adjacent openings 20a and 20b, and it intersects the center line 18 of the openings 21 in the area of minimum thickness between adjacent openings 21a and 21b. As mentioned previously, the area of minimum thickness between any given pair of adjacent openings can be defined as the area between the points where a line connecting the centers of the two openings intersects the edges of such openings.

As can be most clearly seen in FIG. 6, the cutting pattern of this invention provides cut scrap pieces of relatively small and uniform size, and with a minimum of weak points which cause the scrap pieces to have a tendency to bend during the packing thereof in containers. Thus, referring to FIG. 6, the two cuts made by the blades 25 and 26 along lines 43 and 44, respectively, form six scrap pieces A, B, C, D, E and F. The scrap pieces A and F, B and E, and C and D form three symmetrical pairs so that there are only three different scrap configurations. Moreover, the maximum dimension does not vary much among the three configurations. Even more significantly, the only weak points occur in pieces A and F, which contain a small area of metal relative to the other pieces B, C, D and E, so that even if the pieces A and F are bent during the packing operation, they do not significantly reduce the density of the packed scrap.

Another significant advantage of the cutting patter provided by this invention is that the major portion of each blade passes through the openings rather than through the metal, so that the total effective load is minimized, thereby reducing wear on the drive mechanism. Furthermore, each cutting cycle is effected by only two shear blades, which can be readily synchronized with the punch press because the longitudinal width severed in each cutting cycle is the same as the width of metal advanced during each cycle of the blanking operation effected by the press. Finally, the cutting pattern can be achieved with the use of conventional shear cutting equipment, provided it is mounted at the correct angle relative to the scrap skeleton to follow the cutting lines illustrated in FIG. 6.

In accordance with a further aspect of this invention, means are provided for adjusting the longitudinal position of the cutting unit to permit the shear blades to be longitudinally registered with the scrap skeleton to achieve the desired cutting pattern. Thus, as shown most clearly in FIG. 4, the mounting lugs 50 for the cutting unit 23 are received in corresponding slots 51 in the supporting frame 52 to permit limited longitudinal movement of the cutting unit. To adjust the longitudinal position of the cutting unit 23, the operator turns a manual adjustment wheel 53 which is connected via shaft 54 to a worm gear assembly 55 which converts rotational movement of the shaft 54 into longitudinal movement of a shaft 56 connected to the cutting unit 23. Consequently, by simply turning the manual adjustment wheel 43, the operator can precisely position the cutting unit 23 relative to the scrap skeleton so that the cutting line of one of the blades passes substantially through the centers of two adjacent openings in the two rows of openings, and the cutting line of the other blade intersects the longitudinal centerlines 17 and 18 in the areas between adjacent openings in each row. As described previously, the feed rollers 22 then successively advance the scrap skeleton relative to the cutting unit 23 by increments corresponding approximately to the distance between the centers of two adjacent openings in the same row, and the shear blades 25 and 26 are automatically driven downwardly after each incremental advancement so that the skeleton is repetitively cut along successive pairs of cutting lines represented by lines 43, 44 and 45, 46.

With the particular cutting pattern provided by this invention, it has been found that the diameter of the blanks removed from the metal strip in the punch press can be varied by as much as 5 percent to 25 percent with a given pair of shear blades. Provided the blades are positioned to the scrap skeletons so that the shear blades follow the cutting lines illustrated in FIG. 6 for one of the blank diameters. Subsequent variations in the blank diameters can be made while still realizing the basic advantages provided by the invention.

As can be seen from the foregoing detailed description, this invention provides an improved method and apparatus which produces cut scrap of relatively small and uniform size, and relatively high strength to minimize bending during packing thereof, from scrap skeletons having a pattern of staggered longitudinal rows of substantially circular openings. Because of the reduced number of weak points in the cut scrap pieces, which in turn reduces the tendency of the cut scrap pieces to bend, the resulting cut scrap can be packed with a relatively high density, thereby reducing the cost of packing, storing, and transporting the scrap. Furthermore, the method and apparatus of the invention can be used to cut scrap skeletons in which the dimensions of the openings change periodically due to changes in the dimensions of the blanks formed therefrom, within certain limits. Furthermore, the invention permits the scrap material to be cut in a two-blade system which can by synchronized exactly with the movement of a blanking press or the like, and the invention is readily adaptable to conventional press mounted scrap cutters so that the method can be practiced by simply making certain modifications to existing equipment. Also, only a relatively small amount of metal is sheared along each cutting line, thereby facilitating the cutting operation and reducing the wear on the scrap cutting equipment.

I claim as my invention:

1. A method of cutting an elongated strip or sheet of scrap metal or the like from which two or more longitudinal rows of substantially circular sections have been removed to form corresponding substantially circular openings with the openings in each row being offset from the openings in the adjacent row or rows, said method comprising advancing the elongated strip or sheet longitudinally and cutting the same transversely along successive longitudinally spaced lines which are substantially parallel to a line passing through the centers of two adjacent openings in two adjacent rows of said openings.

2. A method of cutting an elongated strip or sheet of scrap metal or the like as set forth in claim 1 wherein said successive longitudinally spaced lines are substantially equally spaced from one another.

3. A method of cutting an elongated strip or sheet of scrap metal or the like as set forth in claim 1 wherein said strip or sheet is repetitively cut along successive pairs of longitudinally spaced, substantially parallel lines which are substantially parallel to a line passing through the centers of two adjacent openings in two adjacent rows of said openings.

4. A method of cutting an elongated strip or sheet of scrap metal or the like as set forth in claim 3 wherein one line in each of said pairs of lines extends through the centers of two adjacent openings in two adjacent rows of said openings, and the other line in each pair intersects the longitudinal centerlines of said rows of openings in the areas between adjacent openings in each of said rows.

5. A method of cutting an elongated strip or sheet of scrap metal or the like as set forth in claim 3 wherein one line in each of said pairs of lines extends through the centers of two adjacent openings in two adjacent rows of said openings, and the other line in each pair intersects a pair of adjacent openings in each of said rows so that symmetrical areas of the intersected openings lie on opposite sides of said other line in each of said rows.

6. A method of cutting an elongated strip or sheet of scrap metal or the like as set forth in claim 1 wherein said successive longitudinally spaced lines intersect lines passing through the centers of said openings in each of said rows at an angle of about 60°.

7. A method of cutting an elongated strip or sheet of scrap metal or the like from which two or more longitudinal rows of substantially circular sections have been removed to form corresponding substantially circular openings which are slightly spaced from each other with the centers of the openings in alternate rows being longitudinally positioned midway between the centers of the openings in intervening rows, said method comprising advancing the elongated strip or sheet longitudinally and cutting the same transversely along substantially parallel lines which are equally spaced from one another with alternate lines passing through the centers of adjacent openings in said alternate and intervening rows.

8. A method of cutting an elongated strip or sheet of scrap metal or the like as set forth in claim 7 wherein the intervening lines of cut intersect the longitudinal centerlines of said rows of openings in the areas between adjacent openings in each of said rows so that said adjacent openings are symmetrically intersected by said intervening lines.

9. A method of cutting an elongated strip or sheet of scrap metal or the like from which two or more longitudinal rows of substantially circular sections have been removed to form corresponding rows of substantially circular openings with adjacent rows of said openings being staggered relative to one another, said method comprising the steps of providing a cutting unit having a pair of shear blades extending transversely across the elongated strip or sheet of scrap metal, positioning said cutting unit relative to said metal strip or sheet so that the cutting line of one of said blades passes substantially through the centers of two adjacent openings in two adjacent rows of said openings and the cutting line of the other of said blades intersects the longitudinal centerlines of said rows of openings substantially in the areas between adjacent openings in each of said rows, successively advancing the metal strip or sheet relative to said cutting unit by increments corresponding approximately to the distance between the centers of two adjacent openings in one of said rows, and cutting the strip or sheet with said shear blades after each incremental advancement thereof so that the strip or sheet is repetitively cut along said cutting lines. passes through the centers of adjacent openings 20a and 21a (FIG. 6), and cutting line 45 passes through the centers of adjacent openings 20b and 21b. The other cutting line in each pair, e.g., lines 44 and 46 followed by blade 26, intersects the longitudinal center lines 17 and 18 of the two rows of openings in the areas between the adjacent openings in each row. For example, cutting line 44 intersects the center line 17 of the openings 20 in the area of minimum thickness between adjacent openings 21a and 21b. As mentioned previously, the area of minimum thickness between any given pair of adjacent openings can be defined as the area between the points where a line connecting the centers of the two openings intersects the edges of such openings.

Another significant advantage of the cutting pattern provided by this invention is that the major portion of each blade passes through the openings rather than through the metal, so that the total effective load is minimized, thereby reducing wear on the drive mechanism. Furthermore, each cutting cycle is effected by only two shear blades, which can be readily synchronized with the punch press because the longitudinal width severed in each cutting cycle is the same as the width of metal advanced during each cycle of the blanking operation effected by the press. Finally, the cutting pattern can be achieved with the use of conventional shear cutting equipment, provided it is mounted at the correct angle relative to the scrap skeleton to follow the cutting lines illustrated in FIG. 6. 52 to permit limited longitudinal movement of the cutting unit. To adjust the longitudinal position of the cutting unit 23, the operator turns a manual adjustment wheel 53 which is connected via shaft 54 to a worm gear assembly 55 which converts rotational movement of the shaft 54 into longitudinal movement of a shaft 56 connected to the cutting unit 23. Consequently, by simply turning the manual adjustment wheel 43, the operator can precisely position the cutting unit 23 relative to the scrap skeleton so that the cutting line of one of the blades passes substantially through the centers of two adjacent openings in the two rows of openings, and the cutting line of the other blade intersects the longitudinal center lines 17 and 18 in the areas between adjacent openings in each row. As described previously, the feed rollers 22 then successively advance the scrap skeleton relative to the cutting unit 23 by increments corresponding approximately to the distance between the centers of two adjacent openings in the same row, and the shear blades 25 and 26 are automatically driven downwardly after each incremental advancement so that the skeleton is repetitively cut along successive pairs of cutting lines represented by lines 43, 44 and 45, 46.

With the particular cutting pattern provided by this invention, it has been found that the diameter of the blanks removed from the metal strip in the punch press can be varied by as much as 5 percent to 25 percent with a given pair of shear blades. Provided the blades are positioned to the scrap skeletons so that the shear blades follow the cutting lines illustrated in FIG. 6 for one of the blank diameters. Subsequent variations in the blank diameters can be made while still realizing the basic advantages provided by the invention.

As can be seen from the foregoing detailed description, this invention provides an improved method and apparatus which on the scrap cutting equipment.

I claim:

1. A method of cutting an elongated strip or sheet of scrap metal or the like from which two or more longitudinal rows of substantially circular sections have been removed to form corresponding substantially circular openings with the openings in each row being offset from the openings in the adjacent row or rows, said method comprising advancing the elongated strip or sheet longitudinally and cutting the same transversely along successive longitudinally spaced lines which are substantially parallel to a line passing through the centers of two adjacent openings in two adjacent rows of said openings.

2. A method of cutting an elongated strip or sheet of scrap metal or the like as set forth in claim 1 wherein said successive longitudinally spaced lines are substantially equally spaced from one another.

4. A method of cutting an elongated strip or sheet of scrap metal or the like as set forth in claim 3 wherein one line in each of said pairs of lines extends through the centers of two adjacent openings in two adjacent rows of said openings, and the other line in each pair intersects the longitudinal center lines of said rows of openings in the areas between adjacent openings in each of said rows.

5. A method of cutting an elongated strip or sheet of scrap metal or the like as set forth in claim 3 wherein one line in each of said pairs of lines extends through the centers of two adjacent openings in two adjacent rows of said openings, and the other line in each pair intersects a pair of adjacent openings in each of said rows so that symmetrical areas of the intersected openings lie on opposite sides of said other line in each of said rows.

9. A method of cutting an elongated strip or sheet of scrap metal or the like from which two or more longitudinal rows of substantially circular section have been removed to form corresponding rows of substantially circular openings with adjacent rows of said openings being staggered relative to one another, said method comprising the steps of providing a cutting unit having a pair of shear blades extending transversely across the elongated strip or sheet of scrap metal, positioning said cutting unit relative to said metal strip or sheet so that the cutting line of one of said blades passes substantially through the centers of two adjacent openings in two adjacent rows of said openings and the cutting line of the other of said blades intersects the longitudinal center lines of said rows of openings substantially in the areas between adjacent openings in each of said rows, successively advancing the metal strip or sheet relative to said cutting unit by increments corresponding approximately to the distance between the centers of two adjacent openings in one of said rows, and cutting the strip or sheet with said shear blades after each incremental advancement thereof so that the strip or sheet is repetitively cut along said cutting lines.

UNITED STATES PATENT OFFICE
CERTIFICATE OF CORRECTION

Patent No. 3,589,221      Dated June 29, 1971

Inventor(s) James J. Deegan

It is certified that error appears in the above-identified patent and that said Letters Patent are hereby corrected as shown below:

Column 5, lines 73-75, all the subject matter beginning with "passes" up to and including column 8, line 17 should be canceled.

Signed and sealed this 30th day of May 1972.

(SEAL)
Attest:

EDWARD M. FLETCHER, JR.
Attesting Officer

ROBERT GOTTSCHALK
Commissioner of Patents